United States Patent [19]
Arroyo et al.

[11] Patent Number: 5,373,100
[45] Date of Patent: Dec. 13, 1994

[54] COMMUNICATION CABLE HAVING WATER-BLOCKING CAPABILITIES

[75] Inventors: Candido J. Arroyo, Lithonia; David S. Hancock, Roswell; John F. Malluck, Marietta; David M. Mitchell, Decatur; Jim J. Sheu, Dunwoody, all of Ga.

[73] Assignee: AT&T Corp., Murray Hill, N.J.

[21] Appl. No.: 147,110

[22] Filed: Nov. 3, 1993

Related U.S. Application Data

[63] Continuation of Ser. No. 891,349, May 29, 1992.

[51] Int. Cl.$^5$ ............................................. H01B 7/28
[52] U.S. Cl. ................................. 174/23 R; 174/236; 174/106 R; 174/107; 174/112; 385/102; 385/107
[58] Field of Search ............... 174/23 R, 23 C, 106 R, 174/107, 112; 385/100, 102, 107

[56] References Cited

U.S. PATENT DOCUMENTS

| | | | |
|---|---|---|---|
| 3,812,283 | 5/1974 | Kothe et al. | 174/23 R X |
| 4,004,077 | 1/1977 | Woytiuk | 174/23 C |
| 4,701,016 | 10/1987 | Gartside, III et al. | 174/70 R |
| 4,815,813 | 3/1989 | Arroyo et al. | 350/96.23 |
| 4,874,219 | 10/1989 | Arroyo et al. | 385/107 |
| 5,038,001 | 8/1991 | Koegel et al. | 174/112 |
| 5,071,221 | 12/1991 | Fujitani et al. | 385/100 |
| 5,082,719 | 1/1992 | Arroyo | 174/230 |
| 5,109,457 | 4/1992 | Panuska et al. | 385/102 |
| 5,146,046 | 9/1992 | Arroyo et al. | 174/23 R |

FOREIGN PATENT DOCUMENTS

| | | | |
|---|---|---|---|
| 544435 | 6/1993 | European Pat. Off. | |
| 2306510 | 10/1976 | France | 174/23 R |
| 1805506 | 5/1970 | Germany | |
| 1598807 | 9/1981 | United Kingdom | |
| 2164198 | 3/1986 | United Kingdom | |

Primary Examiner—Morris H. Nimmo
Attorney, Agent, or Firm—Donald E. Hayes, Jr.

[57] ABSTRACT

A communication cable includes a core comprising at least one transmission medium and a sheath system which is disposed about the core. Means are disposed within the cable for preventing the longitudinal migration of water through the cable core, said means including both a hydrophilic material and a hydrophobic material in cooperative communication with each other. Specifically, a hydrophilic, water-absorptive material is supported by a yarn which is helically wrapped about various sections of the communication core. In a copper cable, the water-absorptive yarn may be wrapped about individual twisted pair conductors or a unit consisting of a plurality of twisted pair conductors or the cable core itself. In addition to the helically-wrapped, water-absorptive yarn, the cable of the present invention includes a hydrophobic, water-blocking material interdisposed to fill all voids and interstices within the communication core.

12 Claims, 2 Drawing Sheets

COMMUNICATION CABLE HAVING WATER-BLOCKING CAPABILITIES

This application is a continuation of application Ser. No. 07/891,349, filed on May 29, 1992.

TECHNICAL FIELD

This invention relates to a communications cable having water-blocking capabilities. More particularly, it relates to a communications cable which includes both a water-absorptive, hydrophilic yarn and a water-repelling, hydrophobic filling compound used in combination to prevent the longitudinal migration of water along the interior of the cable.

BACKGROUND OF THE INVENTION

In the cable industry, it is well known that changes in ambient conditions lead to differences in vapor pressure between the inside and the outside of a plastic cable jacket. This generally operates to diffuse moisture in a unidirectional manner from the outside of the cable to the inside of the cable. Eventually, this will lead to an undesired moisture level inside the cable, especially if a plastic jacket is the only barrier to the ingress of the moisture. Moisture levels inside a cable sheath system may have a detrimental effect on the transmission characteristics of the cable.

Furthermore, water may enter the cable because of damage to the sheath system which compromises the integrity of the cable. For example, lightning, rodent attacks, or mechanical impacts may cause openings in the sheath system of the cable to occur, allowing water to enter and, if not controlled, to move longitudinally within the cable.

Due to the possibility of transmission degradation caused by the presence of water within a cable, cables for transmitting communications signals must meet industry standards with respect to water blocking provisions. For example, one industry standard requires that there be no transmission of water under a pressure head of one meter in one hour through a one meter length of cable.

Lately, optical fiber cables have made great inroads into the communications cable market. Although the presence of water itself within an optical fiber cable is not necessarily detrimental to the performance of optical fibers in the cable, passage of the water within the cable interior to connection points or terminals or associated equipment inside closures, for example, may cause problems, especially in freezing environments and should be prevented.

Filling materials have been used to fill cable cores and atactic polypropylene or other flooding materials have been used to coat portions of cable sheath systems such as the outer surface of a metallic shield, for example, to prevent the longitudinal movement of any water which enters the cable. Although the use of a filling material, generally in the form of a grease or gel-like substance, has limitations, such as causing housekeeping problems, inhibiting manufacturing line speeds because of the need to fill carefully interstices of the cable core and presents problems for field personnel during splicing operations, it continues to be widely used to prevent entry of the water into the core.

As an alternative to the use of filling material as the method of water-blocking, some arrangements of communications cable use one of several forms of longitudinally extending members inside the core tube. Presently, many commercially available cables include a water-swellable tape. The tape is used to prevent the travel of water through the sheath system and into the core as well as its travel longitudinally along the cable to closures and termination points, for example. Such a tape generally is laminated, and includes a water-swellable powder which is positioned between two non-woven tissues. Although such a tape provides suitable water protection for the cable, it is relatively expensive and thick. If the tape is too thick, the diameter of the cable is increased, thereby causing problems in terminating the cable with standard size hardware.

As a solution to some of the foregoing problems, prior art systems have incorporated a water-blocking member in the form of a strip or a yarn which covers only a portion of an inner periphery of the cable. In this way, the strip or the yarn separates only a portion of the jacket from other portions of the sheath system. If adhesion between the jacket and the other portions of the sheath system is desired, that adhesion is not compromised by the water-blocking member. Further, such a strip or yarn is less expensive than one which covers substantially an entire inner periphery of the cable.

Even with the various alternative methods and physical arrangements presently used to prevent the ingress of water through various sections of a communications cable, there still exists a need for a reliable and relatively inexpensive technique for prohibiting water flow within a cable. The use of either a hydrophobic filling material exclusively or a hydrophilic yarn arrangement exclusively do not consistently satisfy the ever-tightening industry standards for water-blocking communication cables.

In general, the use of only water-absorptive yarns does not adequately eliminate all of the voids and interstices created between the various portions of the cable core. This is true even when the yarns are separately wrapped around each of the sections of the cable core. Since the yarn generally is supported by one particular section of the cable core which often has a substantially circular cross-section, interstitial voids exist as the various sections are brought into physical contact with each other. In a copper cable, the various sections of the cable core desired to be wrapped may include a number of 1) individual twisted pair conductors, 2) twisted pair units which each include a plurality of twisted pair conductors, or 3) the entire cable core which generally includes multiple units and twisted pairs.

Furthermore, the use of only water-repelling materials does not adequately fill all of the voids and interstices created between the various portions of the communications core. Even using some of the known high pressure, high temperature methods of inserting gel-like materials to fill a series of crevices does not totally fill each of the desired areas. Furthermore, when the cable is subjected to various forces, such as bending, during manufacturing and installation, the material located within the communication core is often caused to shift, thereby creating new openings through which water may flow longitudinally along the cable. Yet another disadvantage with the use of only water-repelling materials to prevent water movement along a cable is that most, if not all, of the known filling compounds shrink due to thermal cooling after being inserted into the cable. This shrinkage of the filling compound causes additional voids or interstices to be created with no additional means of preventing water flow through the newly created openings.

To date, due to the basic, but drastic, differences in operation of hydrophobic materials and hydrophilic materials, practitioners have purposefully avoided using these two compounds in direct cooperation with each other. Skilled artisans have stated a belief that the operational properties of each type material would unacceptably hinder the effectiveness of the other material.

What is needed and seemingly what is not available is a communications cable which includes increased protection against the flow of water along the cable. The sought-after cable should appropriately incorporate at least two different types of materials to prevent water flow along the cable, specifically both a hydrophobic material in cooperative communication with a hydrophilic material.

SUMMARY OF THE INVENTION

The foregoing problems of the prior art have been overcome by the cables of this invention. A communication cable includes a core comprising at least one transmission medium and a sheath system which is disposed about the core. Means are disposed within the cable for preventing the longitudinal migration of water through the cable core, said means including both a hydrophilic material and a hydrophobic material acting cooperatively with each other. Specifically, a hydrophilic, water-absorptive material is supported by a yarn which is helically wrapped about various sections of the communication core. In a copper cable, the water-absorptive yarn may be wrapped about individual twisted pair conductors or a unit consisting of a plurality of twisted pair conductors or the cable core itself. In addition to the helically-wrapped, water-absorptive yarn, the cable of the present invention includes a hydrophobic, water-blocking material interdisposed to fill voids and interstices within the communication core.

BRIEF DESCRIPTION OF THE DRAWING

Other features of the present invention will be more readily understood from the following detailed description of specific embodiments thereof when read in conjunction with the accompanying drawings, in which.

DETAILED DESCRIPTION

Figure 1:
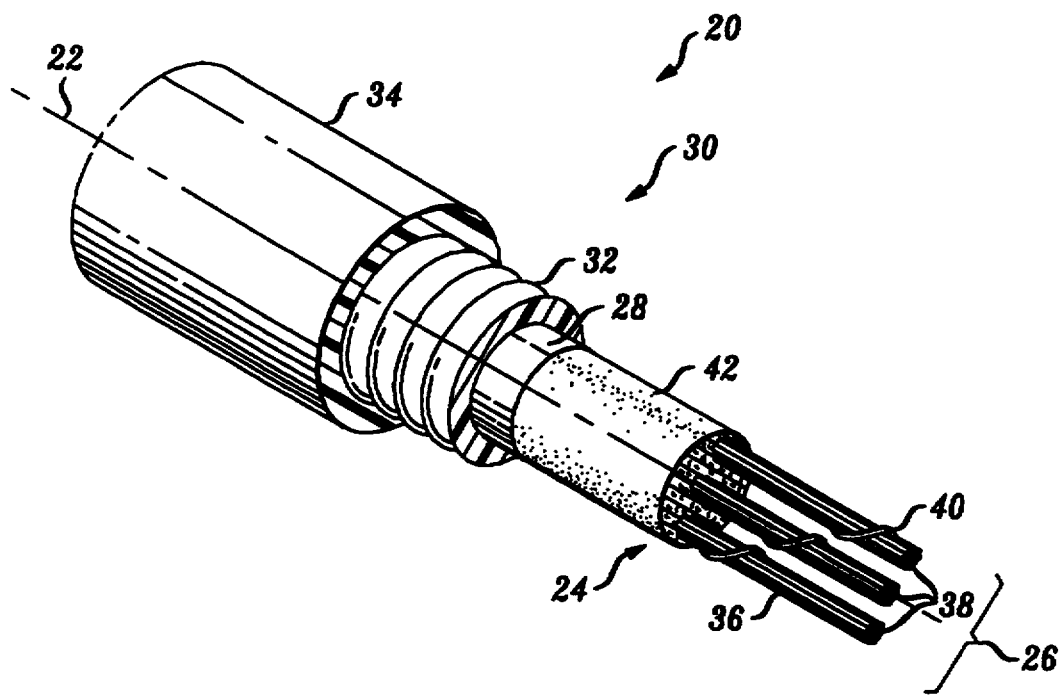
FIG. 1 is a perspective view of a communication cable having a sheath system which includes a water-flow prevention system with various layers of the sheath system broken away and some of the layers exaggerated in thickness for purposes of clarity.
Figure 2:
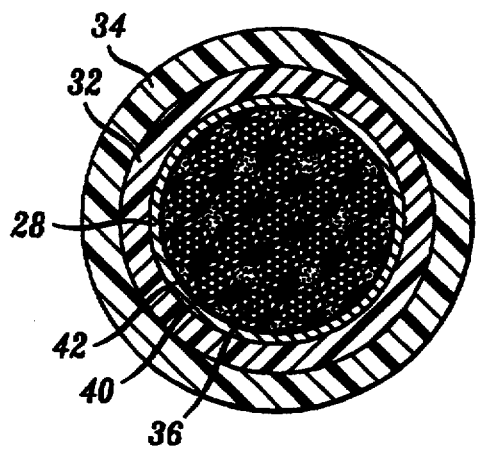
FIG. 2 is an end sectional view of the cable of FIG. 1 which illustrates some elements of the cable in greater detail.

Referring now to FIGS. 1 and 2, there is shown a communications cable which is designated generally by the numeral 20. The cable has a longitudinal axis 22 and includes a core 24 comprising one or more transmission media such as one or more pairs of insulated metallic conductors generally identified as numeral 26. For illustrative purposes, FIG. 1 only depicts three groups or units of transmission media. However, it should be noted that the particular number of conductors and groups of conductors is variable within the scope of the present invention and is viewed as dependent upon the specific application involved.

About the core 24 is disposed a relatively flexible layer 28 of plastic material which often is referred to as a core wrap. Typically, the layer 28 comprises a strip of polyethylene terephthalate plastic material, for example, which has been wrapped about the core 24 in a manner to form a longitudinally extending seam. In existing communication cables, the core wrap layer 28 is necessary to provide physical, circumferential support to maintain the plurality of transmission media in a tightly gathered bundle and to provide electrical insulation between the core and sheath elements. Therefore, it is generally important that the material acting as the core wrap layer 28 has a relatively high tensile and dielectric strength.

About the core wrap layer 28 is disposed a sheath system 30 which generally includes at least one protective layer comprised of a metallic shield 32. The metallic shield layer 32 is typically made of corrugated steel and/or aluminum which has been wrapped longitudinally about the core. Furthermore, the sheath system 30 generally includes a plastic outer jacket 34 which is positioned about the metallic shield 32. Typically, the outer plastic jacket 34 comprises polyethylene plastic material which acts as an external encasement of the entire sheath system 30 and the communication core 24.

It should be noted that a variety of different sheathing systems 30 may be incorporated into a communications cable without escaping the scope of the present invention. In particular, such suitable sheath systems 30 are disclosed in copending and commonly assigned applications, U.S. Pat. No. 5,146,046 and U.S. Pat. No. 5,299,248, both in the name of Arroyo et al. Each of these two applications specifically identified above are hereby incorporated by reference herein.

The above-referenced applications, as well as some of the earlier identified prior art, disclose various provisions for preventing the flow of water longitudinally along the cable. However, in contrast to existing communication cables, the preferred embodiment of the present invention discloses a particular communication cable configuration which utilizes a hydrophilic, water-absorptive yarn in cooperative communication with a hydrophobic, water-repelling material to prevent the longitudinal migration of water within the core of the communication cable.

The preferred embodiment of this invention as illustrated in FIGS. 1 and 2 is directed for use in a communication cable 20 having a plurality of metallic conductors generally identified as 26. One such cable comprises a plurality of individual copper conductors 36-36 configured as twisted pairs. In addition, a plurality of these twisted pair conductors 36-36 are tightly bundled together to create a series of units 38-38. As a matter of example, a specific communication cable may include 15 twisted pair units 38-38 with each unit 38-38 having 100 twisted pair conductors 36-36 located therein.

In the preferred embodiment of the present invention, each unit 38-38 of the communication cable 20 is separately wrapped with a hydrophilic, water-absorptive yarn 40. Typically, such yarn 40 is helically wrapped longitudinally along each unit 38 such that about three turns of the yarn are included in each meter of cable length. However, it should be noted that any well known method of physically applying the yarn, as well as the particular number of wraps per meter cable length, are deemed to be merely matters of design choice within the scope of the present invention. Particularly, the specific number of turns included in each meter of cable length may vary depending upon the exact requirements of the particular application in question. Furthermore, an alternative embodiment of the present invention may incorporate utilizing a superabsorptive tape or like material as a substitute for the yarn.

The individual wrapping of the various sections of the core with a hydrophilic yarn 40 in accordance with the present invention provides numerous advantages. One advantage is realized by utilizing the hydrophilic yarn 40 to tightly bundle and hold a plurality of twisted pair conductors 36-36 together. In addition, the hydrophilic yarns may be color coded to further identify particular sections within the core, thereby positively distinguishing one section of the core 24 from all others. Yet another benefit which results from individually wrapping the various sections of the core relates to an improvement in the mutual capacitance of the cable.

Furthermore, and contrary to known communication cables, the cables 20 of the present invention have further enhanced water-blocking capabilities due to the additional inclusion of a hydrophobic water-repelling material dispersed between the units 38-38 and associated yarn 40 wrapped thereabout. In contrast to the accepted theory of operation for each of these types of material, namely hydrophobic and hydrophilic materials, the arrangement of the present invention allows a hydrophobic, water-repelling material 42 to work in cooperation with a hydrophilic water-absorptive yarn 40 to produce an enhanced ability for the cable to prevent the longitudinal migration of water along the communication core 24.

In general, a hydrophobic material repels and keeps moisture away from a particular location, whereas a hydrophilic material absorbs and immobilizes any moisture present. Due to the opposing theories of operation for these materials, skilled artisans have rejected using both of these materials in combination with each other. Apparently, the problem to date with using a hydrophobic material in combination with a hydrophilic material has revolved around the inability to develop a physical arrangement between the two materials wherein each material does not deteriorate or obviate the benefits normally achieved by the other material.

Specifically, the preferred embodiment of the present invention precisely positions a hydrophilic material, such as a superabsorbent polymer material, through the cable core 24 by utilizing the helically wrapped yarn 40 to support or carry the water-absorptive material. With the water-absorptive yarn 40 in place, a hydrophobic material 42 is used as a filling compound to occupy any voids or interstices remaining within the core 24. The particular arrangement presented herein allows the hydrophobic filling compound 42 to be inserted throughout the core 24 without displacing the hydrophilic material supported by the yarn 40. This physical configuration provides an opportunity wherein the benefits of both a hydrophilic material 40 and a hydrophobic material 42 may be realized while having both materials in cooperative communication with each other within the core 24 of the communication cable 20.

Figure 3:
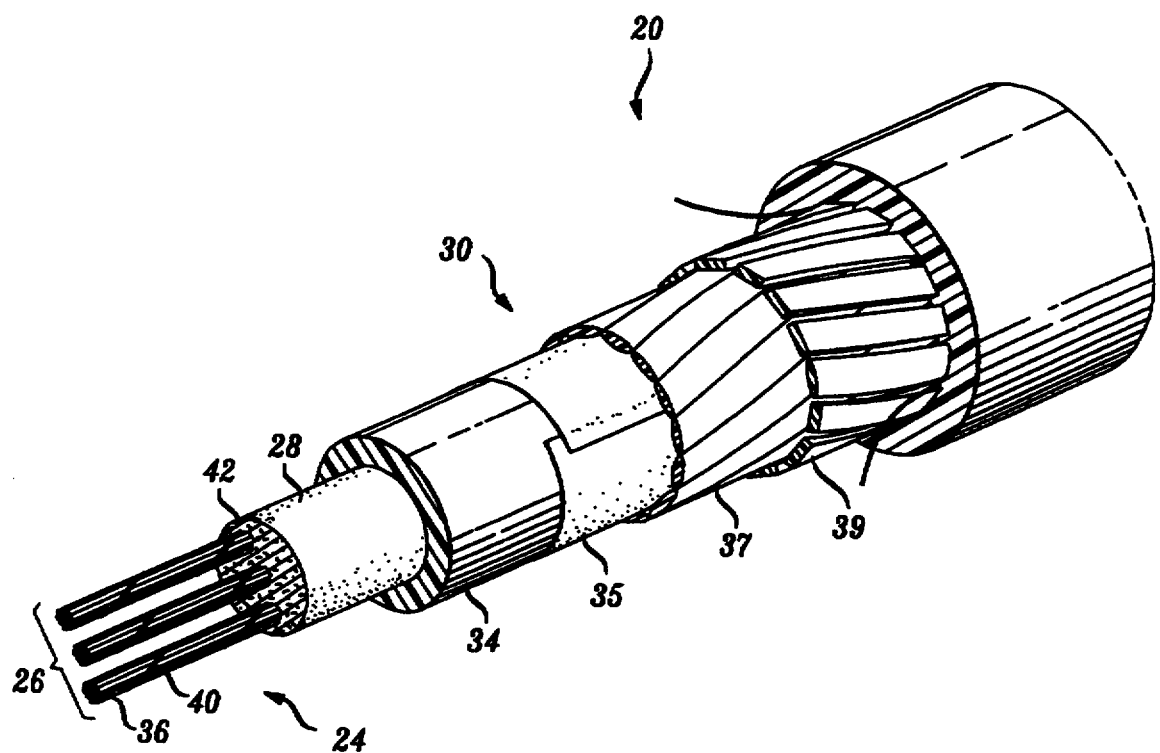
FIG. 3 is a perspective view of an alternative communication cable in accordance with the present invention for a typical cable with fiber optics as the transmission media.

It should be noted that any well known type of water-absorptive yarn or water-blocking filling compound may be used in accordance with the present invention without escaping from within the scope of the invention. Furthermore, the present invention is not limited to the use of copper conductors as the transmission medium, but also is applicable to communication cables containing optical glass fibers as the transmission media. FIG. 3 illustrates a typical fiber optic communication cable in accordance with the present invention. For exemplary purposes, the optical fiber cable of FIG. 3 incorporates a more extensive sheath system than set forth In FIG. 1. Specifically, the core within layer 34 may be further enclosed by a cylindrically wrapped waterblocking tape 35, a pair of helically wrapped strength members 37 and 39 and an outermost plastic jacket 41. It should be understood that the particular cable configuration of FIG. 3 is one of numerous sheath systems which may be utilized in association with the present invention while remaining within the scope of the invention.

As stated earlier, superabsorbents are hydrophilic materials which can absorb and retain water without dissolution in the fluid being absorbed. See J. C. Djoek and R. E. Klern "Review of Synthetic and Starch-Graft Copolymer Superabsorbents" prepared for the Absorbent Products Conference held Nov. 16–17, 1983 in San Antonio, Tex. and incorporated by reference hereinto. Properties such as enzyme stability, biodegradability, absorbent capacity and rate of uptake are used to characterize a superabsorbent material. One of the early superabsorbents was a saponified starch graft polyacrylonitrile copolymer. See U.S. Pat. No. 3,425,071. The above-identified patent discloses saponifying starch-graft polyacrylonitrile copolymers with aqueous bases. Also see U.S. Pat. Nos. 4,090,998, 4,172,066 and 4,511,477.

The two major superabsorbents which are available today are cellulosic or starch-graft copolymers and synthetic superabsorbents. There are two major broad classes of synthetic superabsorbents. These are the polyelectrolytes and the nonelectrolytes. The polyelectrolytes, such as polyacrylic acid superabsorbents, are the most important among several suitable classes. Of these, the polyacrylic acid and polyacrylonitrile-based superabsorbents are most common. As with cellulosic-graft copolymer superabsorbents, the capacity of synthetic superabsorbents decreases with increasing salinity.

The polyacrylic acid class of superabsorbents includes both homopolymers and copolymers of acrylic acids and acrylate salts. The monomer units usually are polymerized to produce a water-soluble polymer which is then rendered insoluble by ionic and/or covalent cross-linking. Cross-linking of the polymer may be accomplished with a multivalent cation, radiation, or with a cross-linking agent. The absorbency of the product is determined by the number of ionizable groups, usually carboxylates, and the cross-linking density.

In another embodiment, yarn 40 is impregnated with an aqueous solution comprising acrylates and acrylamide polymer powders mixed with water. The yarn 40 impregnated with such a composition has a density which may represent an increase as high as about 80% of the density of the untreated yarn. In each of the embodiments just described, the impregnating material is an aqueous solution and applied. In general, the yarn may be impregnated with (1) a material comprising polyacrylic acid, or (2) a material comprising polyacrylamide or (3) blends of (1) and (2)or salts thereof or (4) copolymers of acrylic acid and acrylamides and salts thereof as well as other similar superabsorbents. In addition to the types of yarns set forth above, the yarn 40 may also include superabsorbent fibers which were converted chemically from non-superabsorbent fibers.

It should be noted that any well known hydrophobic material may be used for the filling compound 42 in accordance with the present invention. One such filling material is disclosed in U.S. Pat. No. 4,176,240 issued in the name of R. A. Sabia and which is hereby incorporated by reference herein. The material disclosed is a styreneethylene butylene-styrene block copolymer dissolved in mineral oil, with polyethylene added for consistency.

It is to be understood that the above-described arrangements are simply illustrative of the invention. Other arrangements may be devised by those skilled in the art which will embody the principles of the invention and fall within the spirit and scope thereof.

We claim:

1. A communication cable which comprises:
    a core having a longitudinal axis and comprising at least one transmission medium;
    a layer of a relatively supple plastic material which is disposed about said core;
    a relatively rigid jacket which comprises a plastic material, which is disposed about said layer of plastic material and which is characterized by a relatively uniform thickness; and
    means for preventing the ingress and migration of water within the core wherein said water preventing means comprises a hydrophilic material in the form of a yarn which includes at least one superabsorbent fiber which is the result of a chemical conversion of a non-superabsorptive fiber and which is precisely and controllably positioned throughout the core and a hydrophobic material which is interdisposed throughout the core.

2. The cable of claim 1 wherein the hydrophilic material is positioned within the core as part of a longitudinally aligned yarn.

3. The cable of claim 2 wherein the hydrophilic yarn is helically wrapped about the the at least one transmission media located within the core.

4. The cable of claim 2 further comprising at least one core unit comprising a plurality of transmission media wherein the hydrophilic yarn is helically wrapped about each separate core unit wherein each core unit comprises a plurality of transmission medium.

5. The cable of claim 2 wherein the hydrophilic yarn is helically wrapped about the entire core.

6. The cable of claim 2 wherein the hydrophilic yarn comprises identificational characteristics which provide the capability of distinguishing various sections of the core from each other.

7. The cable of claim 2 wherein the hydrophilic yarn is coated with a superabsorbent material.

8. The cable of claim 2 wherein the hydrophilic yarn is impregnated with a superabsorbent material.

9. The cable of claim 8 wherein the superabsorbent material impregnating the hydrophilic yarn comprises polyacrylic acid.

10. The cable of claim 8 wherein the superabsorbent material impregnating the hydrophilic yarn comprises polyacrylamide.

11. The cable of claim 8 wherein the superabsorbent material impregnating the hydrophilic yarn comprises blends of polyacrylic and polyacrylamide.

12. The cable of claim 8 wherein the superabsorbent material impregnating the hydrophilic yarn comprises copolymers of acrylic acid and acrylamides.

* * * * *